United States Patent
Tago et al.

(10) Patent No.: US 11,933,023 B2
(45) Date of Patent: Mar. 19, 2024

(54) CONSTRUCTION MACHINE (71) Applicant: Hitachi Construction Machinery Co., Ltd., Tokyo (JP)

(72) Inventors: Hisashi Tago, Kashiwa (JP); Takenori Hiroki, Ibaraki (JP); Tomoya Murazumi, Ushiku (JP); Hironori Itou, Tsukuba (JP); Daiki Machida, Tsuchiura (JP); Junya Matsumoto, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 321 days.

(21) Appl. No.: 17/422,026

(22) PCT Filed: Dec. 13, 2019

(86) PCT No.: PCT/JP2019/048935
§ 371 (c)(1),
(2) Date: Jul. 9, 2021

(87) PCT Pub. No.: WO2020/174815
PCT Pub. Date: Sep. 3, 2020

(65) Prior Publication Data
US 2022/0098830 A1  Mar. 31, 2022

(30) Foreign Application Priority Data
Feb. 25, 2019  (JP) .................................. 2019-031342

(51) Int. Cl.
*H02J 7/00* (2006.01)
*E02F 9/20* (2006.01)
*F01N 3/20* (2006.01)

(52) U.S. Cl.
CPC .......... *E02F 9/2095* (2013.01); *F01N 3/2066* (2013.01); *H02J 7/0063* (2013.01); *F01N 2610/02* (2013.01)

(58) Field of Classification Search
CPC ..... E02F 9/2095; E02F 9/0883; E02F 9/2091; E02F 9/2058; E02F 9/226; E02F 9/24;
(Continued)

(56) References Cited

U.S. PATENT DOCUMENTS

| 2013/0106320 A1* | 5/2013 | Yugo | B60L 58/14 |
| | | | 318/139 |
| 2014/0130483 A1* | 5/2014 | Miyake | F01N 3/208 |
| | | | 60/285 |
| 2020/0207288 A1 | 7/2020 | Murazumi et al. | |

FOREIGN PATENT DOCUMENTS

| JP | 2000-41342 A | 2/2000 |
| JP | 2011-63234 A | 3/2011 |

(Continued)

OTHER PUBLICATIONS

International Search Report (PCT/ISA/210) issued in PCT Application No. PCT/JP2019/048935 dated Mar. 17, 2020 with English translation (five (5) pages).

(Continued)

*Primary Examiner* — Lincoln D Donovan
*Assistant Examiner* — Alex W Lam
(74) *Attorney, Agent, or Firm* — Crowell & Moring LLP (57) ABSTRACT

A plus-side main connection line (27) connects electrical equipment (21), (22) to a plus terminal (26A) of a battery (26). A plus-side isolating switch (28) is provided in the plus-side main connection line (27) to connect or disconnect the electrical equipment (21), (22) and or from the plus terminal (26A) of the battery (26). A plus-side auxiliary connection line (30) connects a urea SCR controller (25) to the plus terminal (26A) of the battery (26) in a position (Continued)

upstream of the plus-side isolating switch (28). A minus-side main connection line (32) connects a minus terminal (26B) of the battery (26) to ground. A minus-side isolating switch (33) is provided in the minus-side main connection line (32) to connect or disconnect the minus terminal (26B) of the battery (26) and or from ground.

3 Claims, 5 Drawing Sheets

(58) Field of Classification Search
CPC .. F01N 3/2066; F01N 2610/02; H02J 7/0063; H02J 7/14; Y02A 50/20
See application file for complete search history.

(56) References Cited

FOREIGN PATENT DOCUMENTS

| JP | 2011-172408 A | 9/2011 |
|----|---------------|--------|
| JP | 2016-34793 A  | 3/2016 |
| JP | 2019-107927 A | 7/2019 |

OTHER PUBLICATIONS

Japanese-language Written Opinion (PCT/ISA/237) issued in PCT Application No. PCT/JP2019/048935 dated Mar. 17, 2020 (three (3) pages).

* cited by examiner

CONSTRUCTION MACHINE

TECHNICAL FIELD

The present disclosure relates to a construction machine equipped with a battery.

BACKGROUND ART

In order to comply with regulations (EN474-1) and general requirements (ISO20474-1) required for construction machines equipped with batteries, it is required that a power storage device such as a battery can be easily cut off by a quick coupling or an accessible isolator switch. To cope with this, a construction machine is mainly equipped with a battery isolating device that can easily cut off the negative circuit of the battery.

The battery isolating device for a construction machine includes a main switch that selectively connects or disconnects a plurality of devices to or from a battery, a normally closed type circuit isolating switch that entirely cuts off power supply to all devices from the battery, and a control device with a timer that detects a state in which the main switch has not been used during a pre-set time and controls the circuit isolating switch to an isolated state (for example, refer to Patent Document 1).

PRIOR ART DOCUMENT

Patent Document

Patent Document 1: Japanese Patent Laid-Open No. 2000-41342A

SUMMARY OF THE INVENTION

One of the intended uses of the battery isolating device is to suppress the discharge of the battery during a long-term suspension of the construction machine. The reason for this is that there occurs a problem that a battery voltage gradually decreases during the long-term suspension, as in the case of general transportation machine equipped with a battery. Causes for the battery voltage drop include a spontaneous discharge of the battery, a backup current for retaining the memory of the electrical equipment, or the like, for example. Therefore, a battery isolating device is provided in the midst of the electrical connection between the battery and various electrical equipment, and by cutting off power supply by the battery isolating device during long-term machine suspension, battery discharge and the like can be suppressed.

In addition, the battery isolating device plays roles of protecting a service staff from electric shock during maintenance work on the construction machine (electrical repair work or welding work when modifying the main body, etc.) by the service staff, and preventing damage to the electrical equipment due to the wraparound current from the welding machine. Further, by cutting off power at the end of a day's work by an operator, the battery isolating device has a function of daily battery discharge suppression or theft prevention.

Incidentally, a construction machine is equipped with a urea SCR (Selective Catalytic Reduction) system. The urea SCR system is an aftertreatment device installed in a construction machine for the purpose of complying with engine emission regulations. The urea SCR system purifies nitrogen oxides in the exhaust gas by combining the exhaust gas and urea water in the catalyst installed at the rear stage of the engine. Urea water is stored in a tank, sucked by an electromagnetic pump according to the output of the engine, and injected into the aftertreatment device.

Urea water has a characteristic of expanding when frozen and crystallizing at high temperature. Therefore, if the vehicle body is left with urea water remaining in the piping, it may cause damage to the piping or adhesion of urea therein. Therefore, the urea SCR system is equipped with a function to return unused urea water in the piping to the tank with an electromagnetic pump. Such return control of returning urea water to the tank is performed using the battery power after the engine is stopped.

In the case of a vehicle equipped with a battery isolating device, when the battery is cut off after the engine is stopped and the power supply to the urea SCR system is stopped, return control cannot be performed, and thus, there is a risk that a problem could occur at the time of next injection. In order to prevent the problem, notifying an operator with a cautionary note or a warning lamp so as not to cut off the battery until the return control is completed can be considered as a method. However, since this method allows the operator to cut off the battery at an arbitrary timing, it does not provide a fundamental solution.

On the other hand, when the circuit isolating switch with a timer described in Patent Document 1 is applied to a construction machine equipped with a urea SCR controller, power is supplied to the urea SCR controller within a set time. However, since the time required for return control differs depending on the size of the vehicle body and the type of engine, it is necessary to perform timer setting for each vehicle body.

Even when the battery isolating device is cut off, when power continues to be supplied to the urea SCR controller from the power source without being affected by the set time of the timer etc., the return control can be completed while the power supply to other devices is stopped.

At the end of work by an operator, the battery isolating device is used for the purpose of daily theft prevention or battery discharge suppression. Therefore, at that time, if the power supply for only the urea SCR controller can be utilized, the return control can be completed.

On the other hand, in the case of maintenance work by the service staff or long term suspension of a construction machine, all power including power to the urea SCR controller needs to be cut off to prevent damage to equipment due to electric shock, welding, etc. and to suppress long-term discharge of the battery.

An object of one aspect of the present disclosure is to provide a construction machine which can choose to cut off the power of the electrical equipment excluding the urea SCR controller or to cut off the power of the electrical equipment including the urea SCR controller.

One aspect of the present disclosure is a construction machine which includes: an electrical equipment installed in a vehicle body; a urea SCR controller installed in the vehicle body; and a battery configured to supply power to the electrical equipment and the urea SCR controller, characterized in that: the construction machine further includes: a plus-side main connection line configured to connect the electrical equipment and a plus terminal of the battery; a plus-side isolating switch provided on the plus-side main connection line configured to connect or disconnect the electrical equipment to or from the plus terminal of the battery; a key switch positioned at a downstream side of the plus-side isolating switch and is connected in series to the plus-side isolating switch, configured to connect or disconnect the electrical equipment to or from the plus terminal of the battery; a plus-side auxiliary connection line positioned at an upstream side of the plus-side isolating switch configured to connect the urea SCR controller and the plus terminal of the battery; a minus-side main connection line configured to connect a minus terminal of the battery to ground; and a minus-side isolating switch provided on the minus-side main connection line configured to connect or disconnect the minus terminal of the battery to or from ground.

According to one aspect of the present disclosure, in accordance with the intended use of an operator or a service staff, the plus-side isolating switch and the minus-side isolating switch can be individually set to an isolated state or a connected state. Therefore, by setting the minus-side isolating switch in the connected state and the plus-side isolating switch in the isolated state, it is possible to maintain return control function of urea water by the urea SCR controller while preventing theft and suppression of battery discharge.

Further, by disconnecting the minus-side isolating switch, it is possible to prevent discharge of the battery during a long-term suspension of the vehicle body and to ensure safety during maintenance work by the service staff (electric shock, or damage to the equipment during welding, etc.).

MODE FOR CARRYING OUT THE INVENTION

Hereinafter, a hydraulic excavator will be described in detail as an example of a construction machine according to the embodiment of the present disclosure by referring to the attached drawings.

Figure 1:
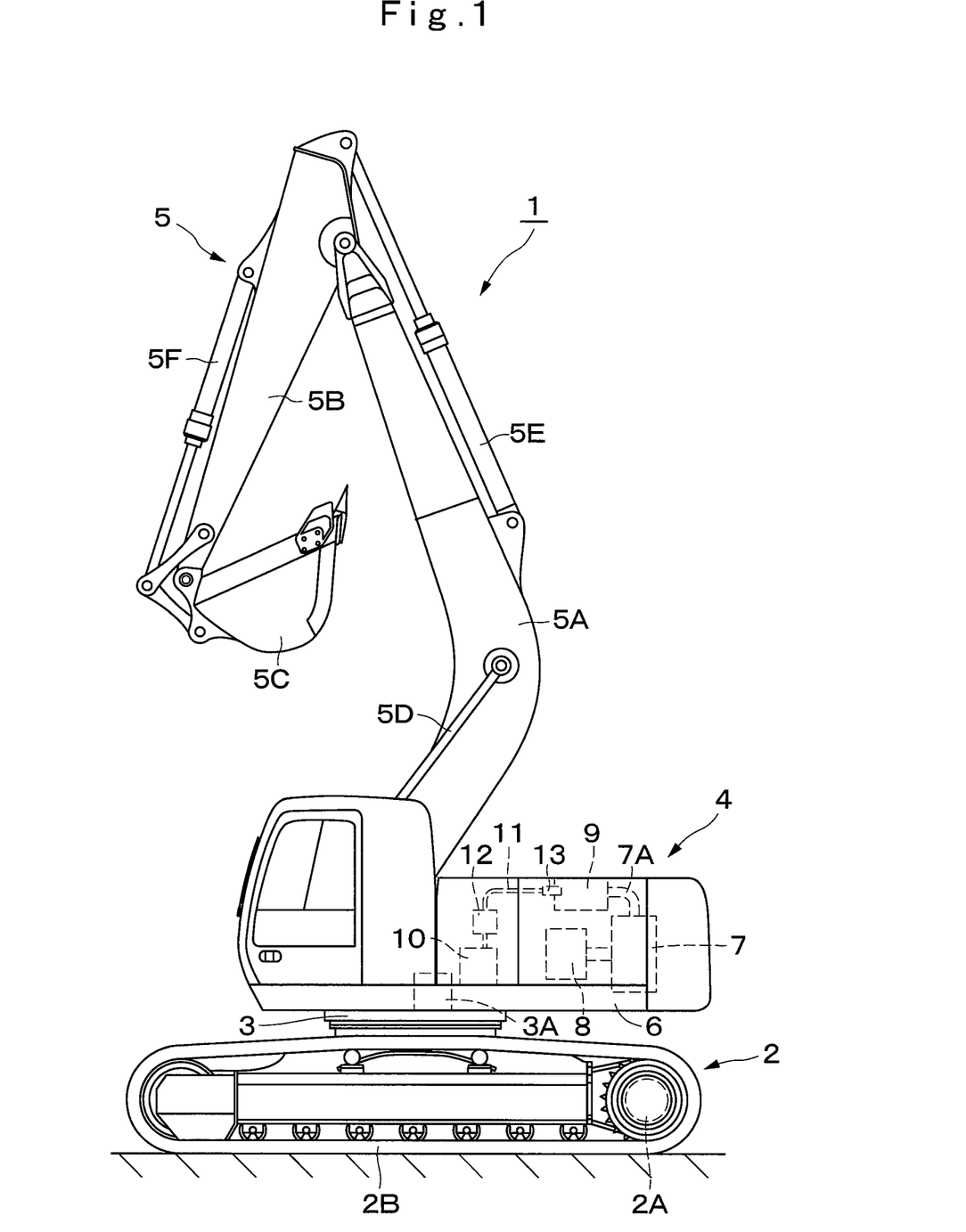
FIG. 1 is a front view showing a hydraulic excavator according to the embodiment of the present disclosure.

As illustrated in FIG. 1, the hydraulic excavator 1 is provided with an automotive crawler-type lower traveling structure 2, an upper revolving structure 4 rotatably mounted on the lower traveling structure 2 serving as a moving means via a revolving device 3, and a working mechanism 5 of a multi-joint structure which is provided on the front side of the upper revolving structure 4 and performs excavating operation and the like. The lower traveling structure 2 and the upper revolving structure 4 constitute the vehicle body of the hydraulic excavator 1. The lower traveling structure 2 is provided with a hydraulic motor 2A for performing traveling operation. The revolving device 3 includes a hydraulic motor 3A for performing turning operation. Here, the lower traveling structure 2 is a crawler type illustrated herein, but may be a wheel type.

The working mechanism 5 corresponds to a front actuator mechanism. The working mechanism 5 is configured by a boom 5A, an arm 5B, a bucket 5C, and a boom cylinder 5D, an arm cylinder 5E, and a bucket cylinder 5F driving the boom 5A, the arm 5B, and the bucket 5C, respectively. The working mechanism 5 is mounted on a revolving frame 6 of the upper revolving structure 4.

In the upper revolving structure 4, an engine 7 as a prime mover and a hydraulic pump 8 (a main pump) driven by the engine 7 are mounted. By hydraulic oil delivered from the hydraulic pump 8, the lower traveling structure 2, the upper revolving structure 4, and the working mechanism 5 operate independently of one another.

Specifically, the lower traveling structure 2 drives a pair of crawlers 2B (only one side is shown in FIG. 1) for traveling by allowing the hydraulic pump 8 to deliver hydraulic oil to the traveling hydraulic motor 2A. The upper revolving structure 4 is rotationally driven by allowing the hydraulic pump 8 to deliver hydraulic oil to a revolving hydraulic motor 3A. The cylinders 5D to 5F expand or contract by hydraulic oil delivered from the hydraulic pump 8. As a result, the working mechanism 5 performs lifting operation, excavation, ground levelling, and the like.

Exhaust gas discharged from an exhaust port 7A of the engine 7 contains nitrogen oxides (NOx). In order to purify nitrogen oxides, an SCR catalyst 9 is connected to the exhaust port 7A of the engine. The SCR catalyst 9 activates the nitrogen oxides and ammonia reaction. Specifically, the SCR catalyst 9 reacts with nitrogen oxide before being discharged into the air with urea water in the SCR catalyst 9 to decompose them into harmless water and nitrogen. A urea water storage tank 10 is installed in a portion of the upper revolving structure 4 where urea water can be easily supplied. The urea water storage tank 10 stores urea water to inject into the SCR catalyst 9.

The urea water storage tank 10 and the SCR catalyst 9 are connected by a urea water piping 11. When the engine 7 is started, an electromagnetic pump 12 is driven to suck up urea water in the urea water storage tank 10. The sucked urea water is injected into the SCR catalyst 9 by a urea water injector 13. Further, when the engine 7 is stopped, the electromagnetic pump 12 performs return control to return the unused urea water remaining in the urea water piping 11 to the urea water storage tank 10. The electromagnetic pump 12 is supplied with power from the urea SCR controller 25 to be described later. The SCR catalyst 9, the urea water storage tank 10, the electromagnetic pump 12, and the urea water injector 13 constitute the urea SCR system.

Subsequently, a configuration related to a power cutoff circuit of the hydraulic excavator 1 according to the present embodiment will be described by referring to FIG. 2 and FIG. 3.

Figure 2:
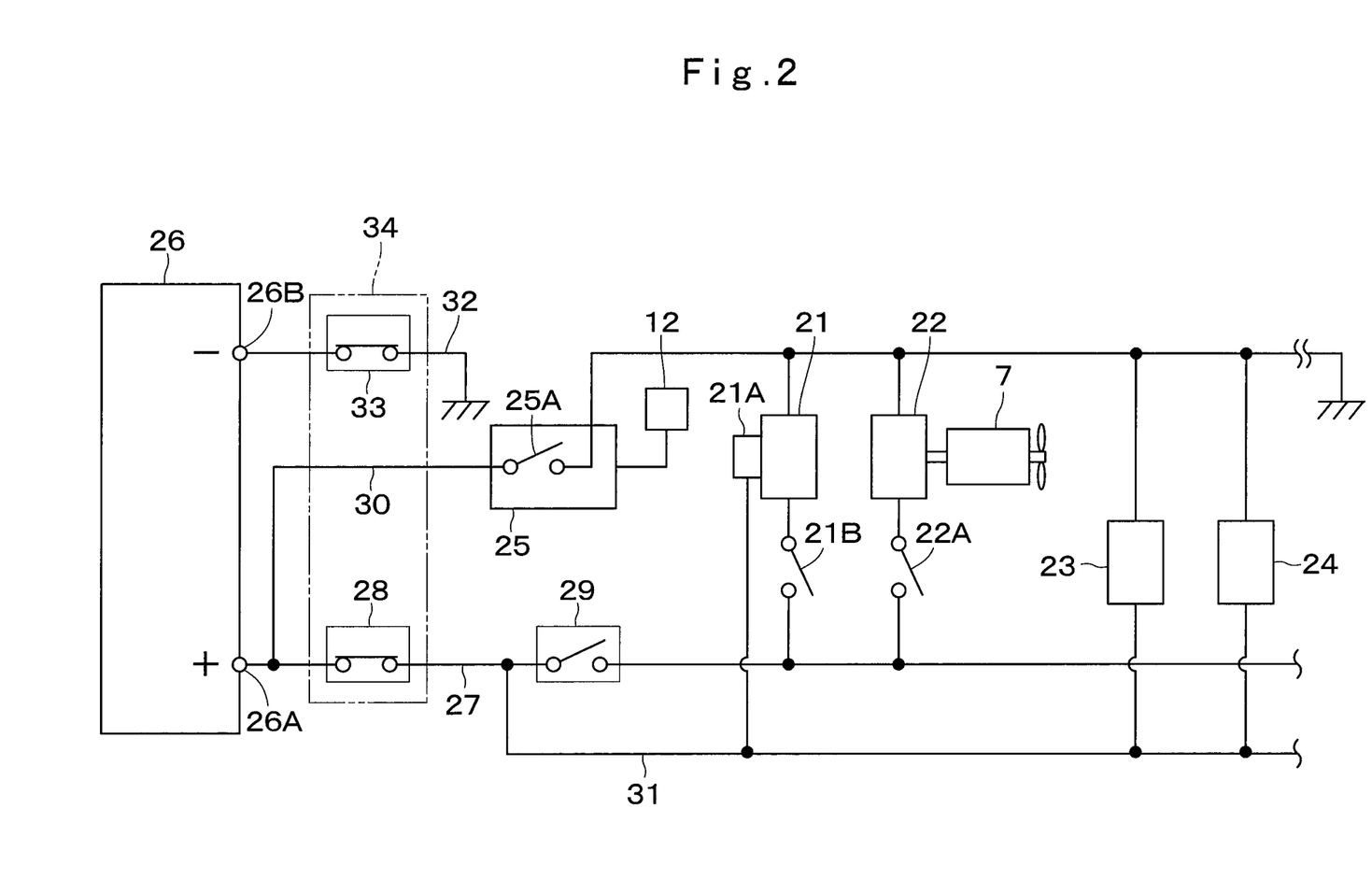
FIG. 2 is an electric circuit diagram showing a configuration of a power cutoff circuit according to the embodiment of the present disclosure.
Figure 3:
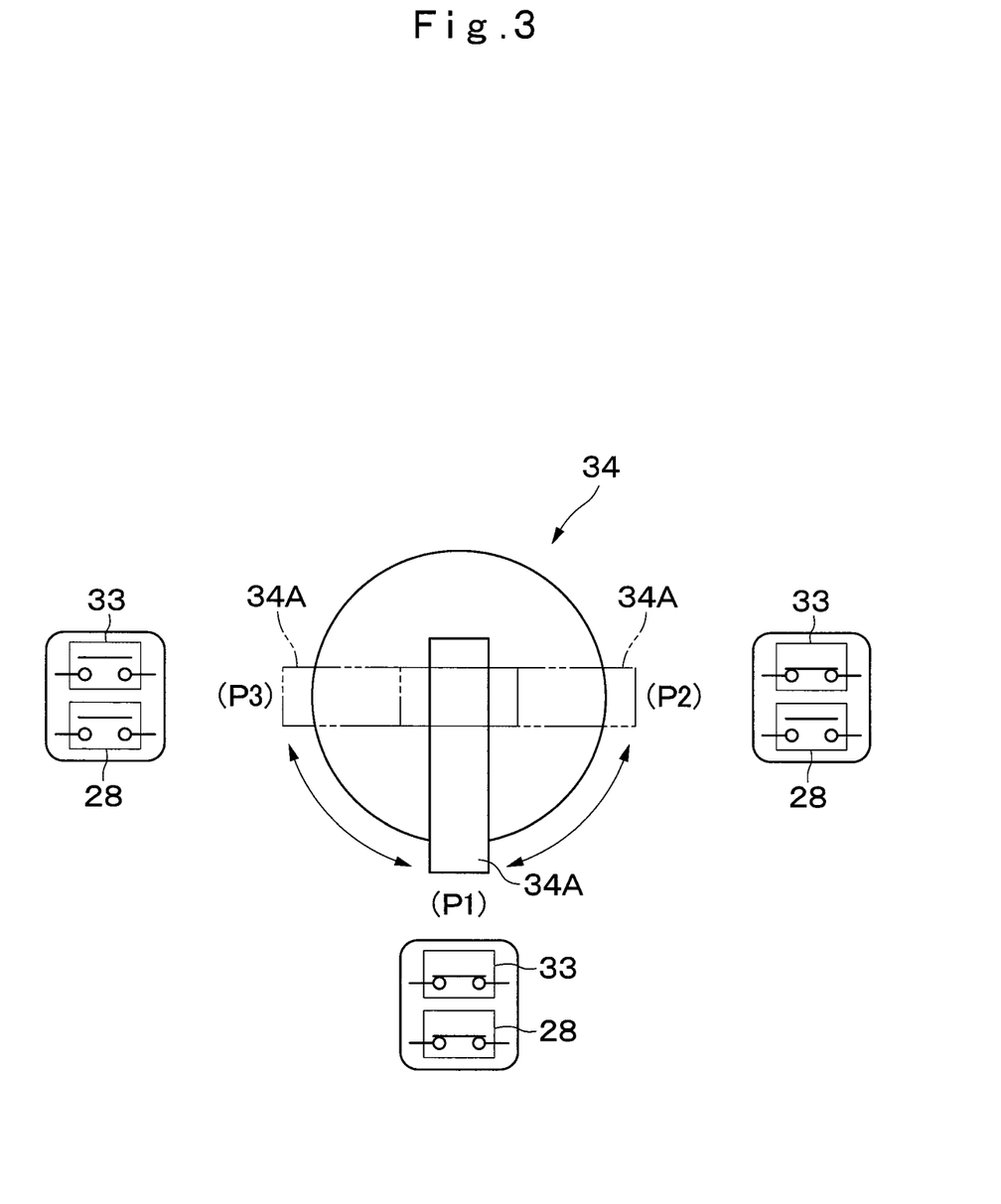
FIG. 3 is an explanatory diagram showing the composite switch in FIG. 2.

As shown in FIG. 2, the hydraulic excavator 1 is provided with first and second electrical equipment 21, 22 installed in the vehicle body, a urea SCR controller 25 installed in the vehicle body, and a battery 26 for supplying power to the electrical equipment 21, 22 and the urea SCR controller 25. Further, the hydraulic excavator 1 is provided with first and second control devices 23, 24 installed in the vehicle body. The first and second control devices 23, 24 are also supplied with power from the battery 26. The electrical equipment 21, 22 and the control devices 23, 24 have functions that are different from that of the urea SCR controller 25. That is, the electrical equipment 21, 22 is provided with functions other than control of the urea SCR system, such as control of lighting, sound, or air conditioning which are auxiliary functions of the vehicle body, or a function to start the engine 7. The control devices 23, 24 performs control other than control of the urea SCR system, such as drive control of the vehicle body (control of the engine 7 or the entire vehicle body). The electrical equipment 21, 22, the control devices 23, 24, the urea SCR controller 25, and the battery 26 are installed in the upper revolving structure 4 as the vehicle body of the hydraulic excavator 1, for example. The electrical equipment 21, 22, the control devices 23, 24 and the urea SCR controller 25 are connected to the vehicle body 4 which serves as ground.

The first electrical equipment 21 corresponds to an audio equipment, for example. The electrical equipment 21 has a memory 21A for storing various setting information such as volume, radio channel selection, preset information, and the like. The first electrical equipment 21 is not limited to the audio equipment, and may be an air conditioner, for example. In this case, various setting information of the air conditioner such as the temperature, the wind direction, the air volume, and the like are stored in the memory 21A. The electrical equipment 21 is additionally provided with a switch 21B for independently switching between driving and stopping. The switch 21B is positioned at a downstream side of a key switch 29 (a side farther from the battery 26), and is provided in a line that individually supplies power to the electrical equipment 21.

The second electrical equipment 22 corresponds to an engine starting device, for example. The second electrical equipment 22 is separately provided with a switch 22A for independently switching between driving and stopping. The switch 22A is positioned at a downstream side of the key switch 29 (farther side from the battery 26) and is provided on a line that individually supplies power to the second electrical equipment 22. When the key switch 29 is switched to the engine start position, the second electrical equipment 22 is put into a connected state and performs start control to the engine 7.

The first control device 23 corresponds to an engine controller, for example. The first control device 23 is connected to various sensors (not shown) for detecting the engine speed, etc., for example. The first control device 23 controls the operation of the engine 7 based on detection signals, etc. from the sensors.

The second control device 24 corresponds to a vehicle body controller, for example. The second control device 24 is connected to the first control device 23 (the engine controller) via a network (CAN: Controller Area Network) of a multiplex communication system for vehicles. The second control device 24 is connected to various sensors (not shown) for detecting, the running speed of the vehicle, the discharge pressure, etc. of the hydraulic pump 8, for example. The second control device 24 controls the entire vehicle body system based on information input from the first control device 23 (for example, engine speed, etc.), detection signals from the sensors, and the like.

The urea SCR controller 25 is connected to the plus-side auxiliary connection line 30, which will be described later. Therefore, the urea SCR controller 25 is supplied with power from the battery 26 without being affected by the operations of the plus-side isolating switch 28 and the key switch 29.

The urea SCR controller 25 controls the urea SCR system. The urea SCR controller 25 controls the supply and stop of power to the electromagnetic pump 12. The urea SCR controller 25 is provided with a self-holding circuit 25A. The self-holding circuit 25A is normally in a connected state. The self-holding circuit 25A operates when the key switch 29 is disconnected, and switches from the connected state to an isolated state when a predetermined time elapses after the key switch 29 is disconnected. At this time, the predetermined time is set to the time required for the return control of urea water. The urea SCR controller 25 can supply power to the electromagnetic pump 12 when the self-holding circuit 25A is in the connected state. The urea SCR controller 25 stops the power supply to the electromagnetic pump 12 when the self-holding circuit 25A is in the isolated state.

The battery 26 is configured by various types of secondary batteries such as a lead storage battery. The battery 26 is electrically connected to the electrical equipment 21, 22 and the urea SCR controller 25. In addition, the battery 26 is electrically connected to the control devices 23, 24. The battery 26 supplies electric power to drive the electrical equipment 21, 22, the control devices 23, 24, and the urea SCR controller 25. The battery 26 has a plus terminal 26A connected to the electrical equipment 21, 22, the control devices 23, 24 and the urea SCR controller 25, and a minus terminal 26B connected to ground. A Plus-side main connection line 27 connects the electrical equipment 21, 22 and the control devices 23, 24 to the plus terminal 26A of the battery 26.

A plus-side isolating switch 28 is provided in the Plus-side main connection line 27. The plus-side isolating switch 28 connects or disconnects the electrical equipment 21, 22 and the control devices 23, 24 to or from the plus terminal 26A of the battery 26. As a result, the plus-side isolating switch 28 permits or stops power supply to the electrical equipment 21, 22 and the control devices 23, 24, including the memory 21A. Further, the plus-side isolating switch 28 is provided in a composite switch 34 together with a minus-side isolating switch 33. When an operator manually operates the composite switch 34, the plus-side isolating switch 28 is switched between a connected state and an isolated state.

The key switch 29 is positioned at a downstream side of the plus-side isolating switch 28 and is connected in series to the plus-side isolating switch 28. Specifically, the key switch 29 is positioned at the downstream side of the plus-side isolating switch 28 and is provided in the Plus-side main connection line 27. The key switch 29 connects or disconnects (cuts off) the electrical equipment 21, 22 to or from the plus terminal 26A of the battery 26. As a result, the key switch 29 permits or stops power supply to the electrical equipment 21, 22. Further, the key switch 29 also has a function of instructing start and stop of the memory 21A of the first electrical equipment 21 and the control devices 23, 24.

By turning on and off the key switch 29, a key-on signal is output to the memory 21A of the electrical equipment 21, the control devices 23, 24, and the urea SCR controller 25. The key switch 29 is a switch (for example, an ignition key switch) for instructing start and stop of the engine 7. When operating the key switch 29 to the engine start position, a switch 22A is put into a connected state, and the second electrical equipment 22 consisting of an engine starting device starts the engine 7.

A plus-side auxiliary connection line 30 connects the urea SCR controller 25 to the plus terminal 26A of the battery 26 at a position upstream of (closer side to the battery 26) the plus-side isolating switch 28. FIG. 2 illustrates a case where the plus-side auxiliary connection line 30 branches off from the Plus-side main connection line 27 at a position upstream of the plus-side isolating switch 28. Alternatively, the plus-side auxiliary connection line 30 may be directly connected to the plus terminal 26A of the battery 26.

The plus-side auxiliary connection line 30 directly connects the urea SCR controller 25 to the plus terminal 26A of the battery 26. Therefore, the urea SCR controller 25 is supplied with power from the battery 26 without being affected at all by the operation of the plus-side isolating switch 28 and the key switch 29.

A plus-side branch line 31 branches from the Plus-side main connection line 27 between the plus-side isolating switch 28 and the key switch 29. The plus-side branch line 31 is connected to the memory 21A of the electrical equipment 21 and the control devices 23, 24. Therefore, when the plus-side isolating switch 28 is in the connected state, the memory 21A of the electrical equipment 21 and the control devices 23, 24 are supplied with power from the battery 26 without being affected at all by the operation of the key switch 29.

That is, the memory 21A of the electrical equipment 21 and the control devices 23, 24 are directly connected to the plus terminal 26A of the battery 26 via the plus-side isolating switch 28 without passing through the key switch 29. Therefore, even when the key switch 29 is turned off (an isolated state), the power supply from the battery 26 is not cut off. Thus, when the key switch 29 is turned off by the OFF operation, the memory 21A of the electrical equipment 21 and the control devices 23, 24 can back up various data including setting information (volume, channel selection, etc.), time information, and control information, for example.

A minus-side main connection line 32 connects the minus terminal 26B of the battery 26 to ground. Here, ground corresponds to the vehicle body of the hydraulic excavator 1. Therefore, the minus-side main connection line 32 is connected to the revolving frame 6 of the upper revolving structure 4, for example.

The minus-side isolating switch 33 is provided in the minus-side main connection line 32. The minus-side isolating switch 33 connects or disconnects the minus terminal 26B of the battery 26 to or from ground. As a result, the minus-side isolating switch 33 permits or stops power supply to the electrical equipment 21, 22, the control devices 23, 24, and the urea SCR controller 25. Further, the minus-side isolating switch 33 is provided in the composite switch 34 together with the plus-side isolating switch 28. When an operator manually operates the composite switch 34, the minus-side isolating switch 33 switches between a connected state and an isolated state.

The composite switch 34 is provided with the plus-side isolating switch 28 and the minus-side isolating switch 33. As shown in FIG. 3, the composite switch 34 includes: a first switching position P1 (a connected position) where both the minus-side isolating switch 33 and the plus-side isolating switch 28 are in a connected state; a second switching position P2 (one side in an isolated position) where the minus-side isolating switch 33 is in a connected state and the plus-side isolating switch 28 is in an isolated state; and a third switching position P3 (both sides in isolated positions) where both the minus-side isolating switch 33 and the plus-side isolating switch 28 are in an isolated state.

Here, the composite switch 34 is provided with a rotary lever 34A for selectively switching the three switching positions P1 to P3. When the lever 34A is placed at a neutral position, the composite switch 34 is set to the first switching position P1. When the lever 34A is rotated from the neutral position in one direction (the right direction in FIG. 3), the composite switch 34 is set to the second switching position P2. When the lever 34A is rotated from the neutral position in the other direction (the left direction in FIG. 3), the composite switch 34 is set to the third switching position P3. That is, with regard to the second switching position P2 and the third switching position P3, the rotating direction when operating the lever 34A becomes opposite, with the first switching position P1 interposed therebetween.

Next, the operation of the power cut-off circuit according to the present embodiment will be described with reference to FIG. 2 to FIG. 5.

During the operating state of the engine 7, the composite switch 34 is set to the first switching position P1. At this time, as shown in FIG. 2, the plus-side isolating switch 28, the minus-side isolating switch 33, and the key switch 29 are all in a connected state. Therefore, the electrical equipment 21, 22, the control devices 23, 24, and the urea SCR controller 25 are supplied with power from the battery 26.

When the key switch 29 is turned off (cut-off), the engine 7 stops. At this time, the first electrical equipment 21 and the second electrical equipment 22 which is the engine starting device, are disconnected from the battery 26 and power supply from the battery 26 is stopped. On the other hand, the memory 21A of the electrical equipment 21, the first control device 23 (the engine controller), the second control device 24 (the vehicle body controller), and the urea SCR controller 25 maintain power supply from the battery 26. As a result, the urea SCR controller 25 drives the electromagnetic pump 12 to execute return control of urea water.

Figure 4:
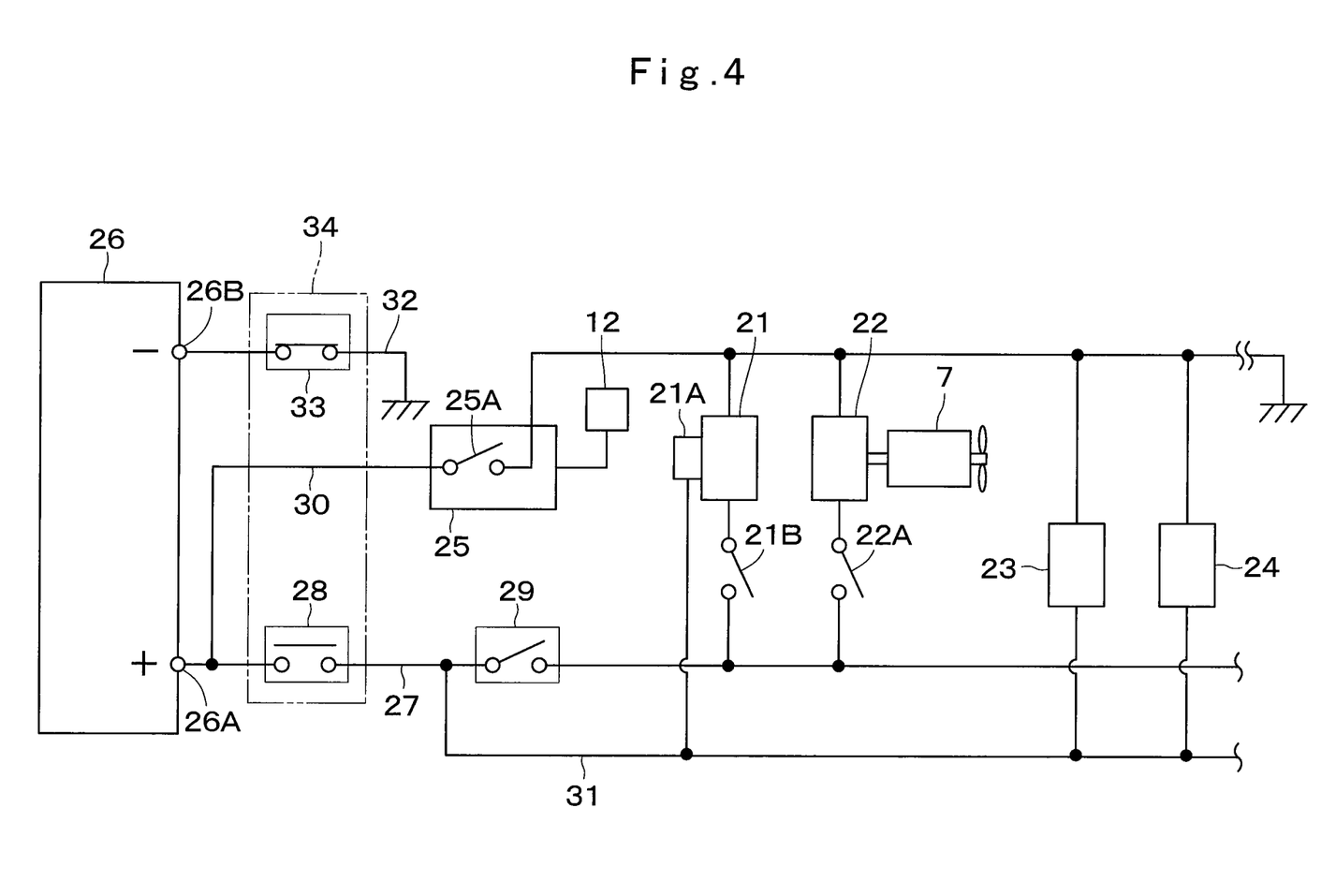
FIG. 4 is an electric circuit diagram similar to FIG. 2 showing a case where a minus-side isolating switch is put into a connected state and a plus-side isolating switch is put into an isolated state.

When an operator finishes work and the vehicle body is in a halted state, the operator switches the composite switch 34 to the second switching position P2. Thereby, as shown in FIG. 4, the plus-side isolating switch 28 is disconnected while the minus-side isolating switch 33 is in the connected state. When the plus-side isolating switch 28 is disconnected, the power supply from the battery 26 to the memory 21A of the electrical equipment 21 and the control devices 23, 24 is stopped. Accordingly, since dark current of the vehicle body is reduced, discharge of the battery 26 can be suppressed to the utmost extent, and so-called battery exhaustion can be prevented.

Further, for example, when an operator switches the composite switch 34 to the second switching position P2 immediately after disconnecting the key switch 29, unused urea water may remain in the urea water piping 11. At this time, the urea SCR controller 25 continues to be supplied with power from the battery 26. Therefore, even when unused urea water remains in the urea water piping 11, the urea SCR controller 25 can drive the electromagnetic pump 12 to complete return control of urea water. After completing return control of urea water, the urea SCR controller 25 disconnects the internal self-holding circuit 25A and cuts off power supply to the electromagnetic pump 12.

Figure 5:
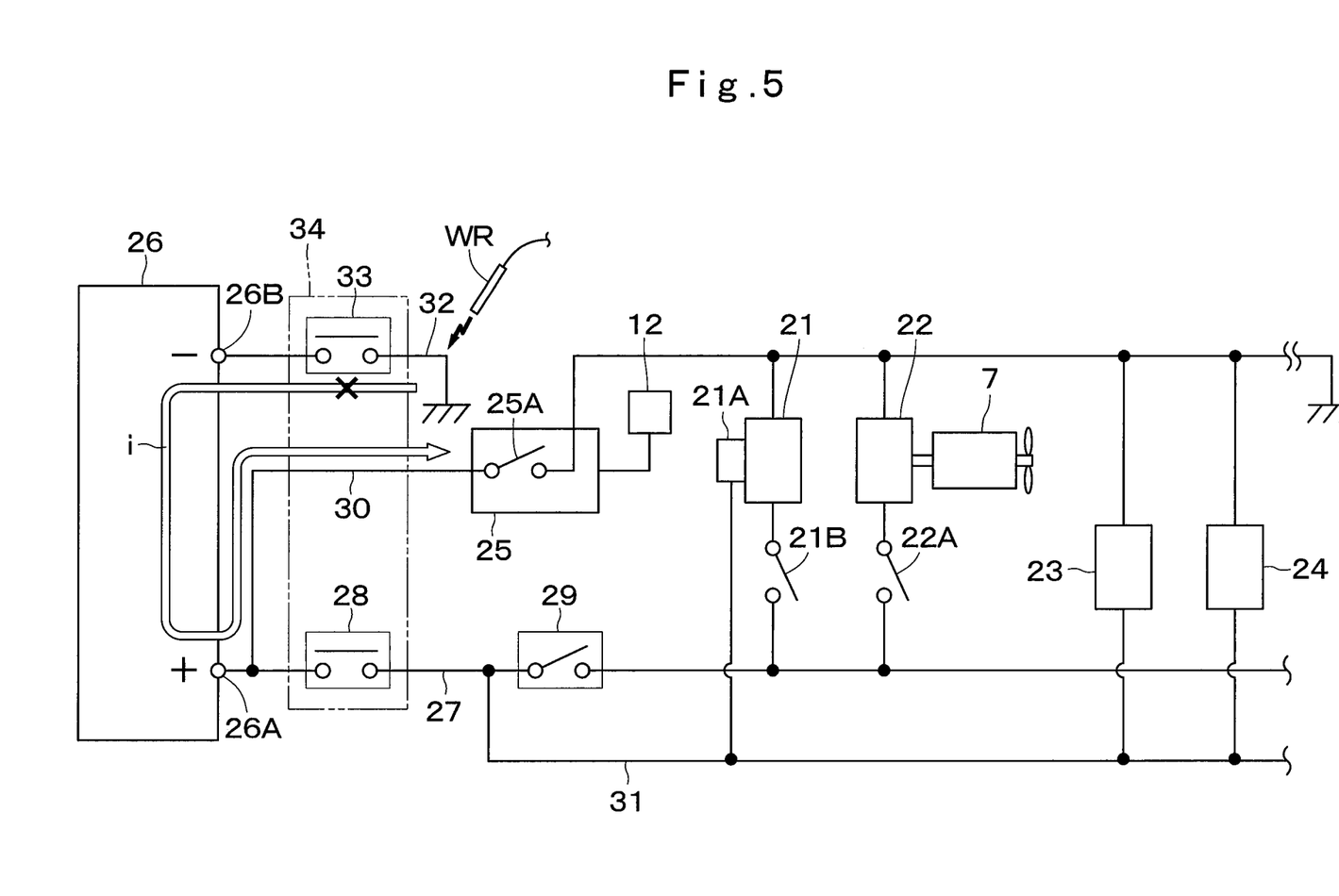
FIG. 5 is an electric circuit diagram similar to FIG. 2 showing a case where both the plus-side isolating switch and the minus-side isolating switch are put into an isolated state.

Next, when performing electrical maintenance or repair work, or when using a welding machine for vehicle body modification, a service staff switches the composite switch 34 to the third switching position P3. Thereby, as shown in FIG. 5, both the plus-side isolating switch 28 and the minus-side isolating switch 33 are disconnected. When the switches 28, 33 are disconnected, all the electrical equipment 21, 22, the control devices 23, 24, and the urea SCR controller 25 are totally cut off from the battery 26 and power supply from the battery 26 is stopped. Therefore, the service staff can be protected from electric shock. Further, for example, even when performing welding work on the revolving frame 6 or the like serving as ground, current i from a welding rod WR can be cut off by the minus-side isolating switch 33 or the like. Therefore, the current i from the welding rod WR does not flow into the electrical equipment 21, 22, the control devices 23, 24, or the urea SCR controller 25 via the battery 26. As a result, it is possible to prevent damages to the electrical equipment 21, 22, the control devices 23, 24, and the urea SCR controller 25.

Thus, the hydraulic excavator 1 according to the present embodiment includes: the Plus-side main connection line 27 configured to connect the electrical equipment 21, 22 and the plus terminal 26A of the battery 26; the plus-side isolating switch 28 provided on the Plus-side main connection line 27 configured to connect or disconnect the electrical equipment 21, 22 to or from the plus terminal 26A of the battery 26; the key switch 29 positioned at the downstream side of the plus-side isolating switch 28 and is connected in series to the plus-side isolating switch 28 configured to connect or disconnect the electrical equipment 21, 22 to or from the plus terminal 26A of the battery 26; the plus-side auxiliary connection line 30 positioned at an upstream side of the plus-side isolating switch 28 configured to connect the urea SCR controller 25 and the plus terminal 26A of the battery 26; the minus-side main connection line 32 configured to connect the minus terminal 26B of the battery 26 and ground; and the minus-side isolating switch 33 provided on the minus-side main connection line 32 configured to connect or disconnect the minus terminal 26B of the battery 26 to or from ground.

Here, the plus-side isolating switch 28 and the minus-side isolating switch 33 can be disconnected or connected individually. Therefore, when operating the hydraulic excavator 1, an operator connects both the plus-side isolating switch 28 and the minus-side isolating switch 33. Thus, by connecting the key switch 29, the electrical equipment 21, 22 can be supplied with electric power from the battery 26 to drive the electrical equipment 21, 22. On the other hand, by disconnecting the key switch 29, the electrical equipment 21, 22 can be stopped.

Further, when normal vehicle body operation is completed, an operator can disconnect the plus-side isolating switch 28 while the minus-side isolating switch 33 is in a connected state. Thus, the electrical equipment 21, 22 can be stopped while power supply from the battery 26 to the urea SCR controller 25 is maintained. As a result, the urea SCR controller 25 can complete return control of urea water using the electromagnetic pump 12. On the other hand, since power supply to the electrical equipment 21, 22 is stopped, dark current can be reduced, and discharge of the battery 26 can be minimized.

Further, when performing electrical maintenance or repair work, or when using the welding machine for main body modification, a service staff disconnects both the plus-side isolating switch 28 and the minus-side isolating switch 33. Accordingly, this configuration not only protects the service staff from electric shock, but also prevents the electrical equipment 21, 22 and the like installed in the vehicle body from being damaged due to the wraparound of the welding current from the welding machine or the like.

Further, the plus-side isolating switch 28 and the minus-side isolating switch 33 are provided in the composite switch 34. The composite switch 34 includes: a first switching position P1 where both the plus-side isolating switch 28 and the minus-side isolating switch 33 are in a connected state; a second switching position P2 where the minus-side isolating switch 33 is in a connected state and the plus-side isolating switch 28 is in an isolated state; and a third switching position P3 where both the plus-side isolating switch 28 and the minus-side isolating switch 33 are in an isolated state.

Therefore, by switching the composite switch 34, the plus-side isolating switch 28 and the minus-side isolating switch 33 can be switched simultaneously. Here, if the minus-side isolating switch 33 and the plus-side isolating switch 28 are provided separately, since these are to be switched individually, then the plus-side isolating switch 28 may be mistakenly disconnected with the intention of disconnecting the minus-side isolating switch 33, for example. On the contrary, since the minus-side isolating switch 33 and the plus-side isolating switch 28 are simultaneously switched by using the composite switch 34, erroneous disconnection or erroneous connection of the switches 28, 33 can be suppressed.

Further, the first electrical equipment 21 has a memory 21A where the memory 21A is connected to the plus-side branch line 31 branched from the Plus-side main connection line 27 at a position between the plus-side isolating switch 28 and the key switch 29. Therefore, even when the key switch 29 is disconnected, power can be supplied from the battery 26 to the memory 21A, and various information and the like stored in the memory 21A can be retained.

Further, the plus-side branch line 31 is connected to the control devices 23, 24 installed in the construction machine. Therefore, even when the key switch 29 is disconnected, the control devices 23, 24 can be operated. Thus, when the operation of the hydraulic excavator 1 is stopped by turning off the key switch 29, the control devices 23, 24 can back up data. Further, since the plus-side branch line 31 is connected to the downstream side of the plus-side isolating switch 28, by disconnecting the plus-side isolating switch 28, in addition to the electrical equipment 21, 22, dark current flowing through the memory 21A and the control devices 23, 24 can also be suppressed.

Further, the urea SCR controller 25 is provided with a self-holding circuit 25A. When the key switch 29 is disconnected, the urea SCR controller 25 puts the self-holding circuit 25A into a connected state, and executes control (return control) to return urea water into a urea water storage tank 10. Thereby, when the key switch 29 is disconnected and the engine 7 is stopped, the urea SCR controller 25 keeps the self-holding circuit 25A in the connected state until return control is completed. As a result, unused urea water does not remain in the urea water piping 11 after the engine 7 is stopped, and damage to the urea water piping 11 can be prevented. In addition, the urea SCR controller 25 puts the self-holding circuit 25A in a cut-off state when the control to return urea water to the urea water storage tank 10 is completed after the key switch 29 is disconnected. Thereby, dark current in the urea SCR controller 25 can be eliminated.

Further, the predetermined time for the self-holding circuit 25A to maintain the connected state is individually set in advance according to the urea SCR system. Therefore, unlike the case where a battery isolating device is equipped with a timer, it is not necessary to set the timer for each vehicle body, and thus, productivity can be improved.

Here, in the above-described embodiment, the plus-side isolating switch 28 and the minus-side isolating switch 33 are provided integrally with the composite switch 34. The present disclosure is not limited thereto, and for example, the plus-side isolating switch 28 and the minus-side isolating switch 33 may be provided separately and independently. In such a case, the plus-side isolating switch 28 and the minus-side isolating switch 33 can be switched separately and independently. In addition, the plus-side isolating switch 28 and the minus-side isolating switch 33 can be arranged apart from each other. Therefore, the plus-side isolating switch 28 can be arranged at a position near an operator, for example. On the other hand, in order to be usable during maintenance, the minus-side isolating switch 33 can be arranged at a position which is difficult to access for the operator.

In the above-described embodiment, a crawler type hydraulic excavator 1 has been exemplified as a construction machine. The present disclosure is not limited thereto, and may be applied to any construction machine having an electrical equipment, a urea SCR controller and a battery, and is applicable to various types of construction machines such as a wheel type hydraulic excavator or a wheel loader.

DESCRIPTION OF REFERENCE NUMERALS

1: Hydraulic excavator (Construction machine)
2: Lower traveling structure
4: Upper revolving structure
10: Urea water storage tank (Tank)
21: First electrical equipment
22: Second electrical equipment
23: First control device
24: Second control device
25: Urea SCR controller
25A: self-holding circuit
26: Battery
26A Plus terminal
26B: Minus terminal
27: Plus-side main connection line
28: Plus-side isolating switch
29: Key switch
30: Plus-side auxiliary connection line
31: Plus-side branch line
32: Minus-side main connection line
33: Minus-side isolating switch
34: Composite switch

The invention claimed is:

1. A construction machine comprising:
an electrical equipment installed in a vehicle body;
a urea SCR controller installed in the vehicle body; and
a battery configured to supply power to the electrical equipment and the urea SCR controller, characterized in that:
the construction machine further comprises:
a plus-side main connection line configured to connect the electrical equipment and a plus terminal of the battery;
a plus-side isolating switch provided on the plus-side main connection line configured to connect or disconnect the electrical equipment to or from the plus terminal of the battery;
a key switch positioned at a downstream side of the plus-side isolating switch and is connected in series to the plus-side isolating switch, configured to connect or disconnect the electrical equipment to or from the plus terminal of the battery;
a plus-side auxiliary connection line positioned at an upstream side of the plus-side isolating switch configured to connect the urea SCR controller and the plus terminal of the battery;
a minus-side main connection line configured to connect a minus terminal of the battery to ground; and
a minus-side isolating switch provided on the minus-side main connection line configured to connect or disconnect the minus terminal of the battery to or from ground,
wherein the plus-side isolating switch and the minus-side isolating switch are provided in a composite switch,
wherein the composite switch is configured to include:
a first switching position where both the plus-side isolating switch and the minus-side isolating switch are in a connected state;
a second switching position where the minus-side isolating switch is in the connected state and the plus-side isolating switch is in an isolated state; and
a third switching position where both the plus-side isolating switch and the minus-side isolating switch are in the isolated state.

2. The construction machine according to claim 1, wherein the plus-side isolating switch and the minus-side isolating switch are provided separately from each other.

3. A construction machine comprising:
an electrical equipment installed in a vehicle body;
a urea SCR controller installed in the vehicle body; and
a battery configured to supply power to the electrical equipment and the urea SCR controller, characterized in that:
the construction machine further comprises:
a plus-side main connection line configured to connect the electrical equipment and a plus terminal of the battery;
a plus-side isolating switch provided on the plus-side main connection line configured to connect or disconnect the electrical equipment to or from the plus terminal of the battery;
a key switch positioned at a downstream side of the plus-side isolating switch and is connected in series to the plus-side isolating switch, configured to connect or disconnect the electrical equipment to or from the plus terminal of the battery;
a plus-side auxiliary connection line positioned at an upstream side of the plus-side isolating switch configured to connect the urea SCR controller and the plus terminal of the battery;
a minus-side main connection line configured to connect a minus terminal of the battery to ground; and
a minus-side isolating switch provided on the minus-side main connection line configured to connect or disconnect the minus terminal of the battery to or from ground,
wherein the urea SCR controller is provided with a self-holding circuit,
the urea SCR controller puts the self-holding circuit into a connected state and executes control to return urea water to a tank when the key switch is turned off, and
after the key switch is turned off, the urea SCR controller puts the self-holding circuit into a cut-off state when the control to return urea water to the tank is completed.

* * * * *